US008924736B1

(12) United States Patent
Dusan et al.

(10) Patent No.: US 8,924,736 B1
(45) Date of Patent: Dec. 30, 2014

(54) BIOMETRIC SUBJECT VERIFICATION BASED ON ELECTROCARDIOGRAPHIC SIGNALS

(71) Applicant: The United States of America as Represented by the Administrator of the National Aeronautics & Space Administration (NASA), Washington, DC (US)

(72) Inventors: Sorin V. Dusan, San Jose, CA (US); Charles C. Jorgensen, Palo Alto, CA (US)

(73) Assignee: The United States of America as Represented by the Administrator of the National Aeronautics & Space Administration (NASA), Washington, DC (US)

( * ) Notice: Subject to any disclaimer, the term of this patent is extended or adjusted under 35 U.S.C. 154(b) by 10 days.

(21) Appl. No.: 13/793,998

(22) Filed: Mar. 11, 2013

(51) Int. Cl.
 *G06F 21/00* (2013.01)
 *G06F 21/32* (2013.01)
 *G06K 9/00* (2006.01)

(52) U.S. Cl.
 CPC ...... *G06F 21/32* (2013.01); *G06K 2009/00939* (2013.01)
 USPC ........ 713/186; 340/5.52; 340/5.81; 340/5.82; 382/115; 382/128

(58) Field of Classification Search
 CPC ..................... G06F 21/32; G06K 2009/00939
 USPC .......................................................... 726/19
 See application file for complete search history.

(56) References Cited

U.S. PATENT DOCUMENTS

| | | | |
|---|---|---|---|
| 6,064,907 A | 5/2000 | Thong et al. | |
| 6,483,929 B1 * | 11/2002 | Murakami et al. | 382/115 |
| 8,346,351 B2 | 1/2013 | Hadley | |
| 8,600,485 B2 | 12/2013 | Halamek et al. | |
| 2003/0128867 A1 * | 7/2003 | Bennett | 382/115 |
| 2003/0135097 A1 * | 7/2003 | Wiederhold et al. | 600/301 |
| 2009/0009284 A1 * | 1/2009 | Sako | 340/5.82 |
| 2010/0090798 A1 * | 4/2010 | Garcia Molina et al. | 340/5.53 |
| 2011/0209214 A1 * | 8/2011 | Simske et al. | 726/21 |

OTHER PUBLICATIONS

Nasri et al., Using ECG as a Measure in Biometric Identification Systems, Sep. 2009, IEEE Toronto International Conference on Science and Technology for Humanity, pp. 28-33.*

(Continued)

*Primary Examiner* — Mohammad L Rahman
*Assistant Examiner* — Kenneth Chang
(74) *Attorney, Agent, or Firm* — John F. Schipper; Robert M. Padilla

(57) ABSTRACT

A method of authenticating or declining to authenticate an asserted identity of a candidate-person. In an enrollment phase, a reference PQRST heart action graph is provided or constructed from information obtained from a plurality of graphs that resemble each other for a known reference person, using a first graph comparison metric. In a verification phase, a candidate-person asserts his/her identity and presents a plurality of his/her heart cycle graphs. If a sufficient number of the candidate-person's measured graphs resemble each other, a representative composite graph is constructed from the candidate-person's graphs and is compared with a composite reference graph, for the person whose identity is asserted, using a second graph comparison metric. When the second metric value lies in a selected range, the candidate-person's assertion of identity is accepted.

24 Claims, 10 Drawing Sheets

(56) References Cited

OTHER PUBLICATIONS

Fatemian et al., HeartID: Cardiac biometric recognition, Sep. 2010, Fourth IEEE International Conference on Biometrics: Theory Applications and Systems (BTAS), pp. 1-5.*

Bazett, An Analysis of the Time Relations of Electrocardiograms, Heart, Apr. 1997 History of Electrocardiology, vol. 2, No. 2, pp. 177-194.

Danter, et al., The heart rate-PR interval relationship; A model for evaluating drug actions on SA and AV nodal function, British Journal of Clinical Pharmacology, 1990, 490-492, 30.

Dempster, et al., Maximum Likelihood from Incomplete Data via the EM Algorithm, Journal of the Royal Statistical Society, Series B (Methodological), 1977, 1-38, JSTOR.

* cited by examiner

BIOMETRIC SUBJECT VERIFICATION BASED ON ELECTROCARDIOGRAPHIC SIGNALS

ORIGIN OF THE INVENTION

This invention described herein was made in the performance of work under a NASA contract and by an employee of the United States Government and is subject to the provisions of Public Law 96-517 (35 U.S.C. §202) and may be manufactured and used by or for the Government for governmental purposes without the payment of any royalties thereon or therefore.

FIELD OF THE INVENTION

This invention relates to verification of an asserted identity of a candidate person, using biometric indicia.

BACKGROUND OF THE INVENTION

One or more biometric indicia, such as fingerprints, voiceprints, retinal scans and facial features, are often proposed to be used to identify, or to authenticate the asserted identity of a user who seeks access to a given resource. Approximately a dozen different biometric indicia have been proposed, but implementation methods for some of these approaches have not been disclosed. Many of these biometric indicia are associated with inherent physiological characteristics of the user's body. Another set of such indicia relate to what may be characterized as behavioral characteristics that partly reflect a learning or behavioral process and do not rely exclusively on purely physiological features. Use of one or more of these behavioral characteristics as a biometric indicium has received relatively little attention, in part because of the perceived difficulty of implementing a procedure to measure such a characteristic.

An example of a new physiological biometric feature is a sequence of bioelectric signals associated with cycles of the heart.

Cardiac muscle is myogenic and is capable of generating an action potential and depolarizing and repolarizing signals from within the muscle itself. An intrinsic conduction system (ICS), a group of specialized cardiac cells, passes an electrical signal throughout the heart, schematically illustrated in FIG. 1. The ICS includes a sino-atrial (SA) node, an atrio-ventrical (AV) node, the bundle of His, right and left bundle branches, and the Purkinje fiber. These components spread the depolarization waves from the top (atria) of the heart down through the ventricles. The autonomic nervous system modulates the rhythm, rate and strength of cardiac contraction. When the cardiac muscle fibers contract, the volumes within the two atrial or two ventricle chambers are reduced and blood pressure increases. The (smaller) atrial chambers receive blood from the veins and pump the blood into the (larger) ventricle chambers, which pump blood out into the major arteries. The heart cycle normally begins in the right atrial chamber, and spreads to the left atrial chamber and then to the two ventricles. The atrial contraction is followed by the ventricular contraction in each cycle.

Simultaneous contraction of the large number of fibers in the ICS generates an electrical field that can be measured at the body surface using an electrocardiograph (ECG). This electrical signal includes a sequence of PQRST complexes, one of which is schematically illustrated in FIG. 2. Most PQRST sequences are not uniform. The time interval between two consecutive R signal peaks, referred to as an R-R interval, corresponds to a heart pulse, with a rate that normally lies in a range of 60-90 beats per minute (bpm). The P signal corresponds to atrial depolarization (right side, followed by left side); the larger QRS complex corresponds to depolarization of the ventricles and repolarization of the atria; and the T signal corresponds to repolarization of the ventricles. A weaker U signal occasionally appears on the chart, representing remnants of ventricular repolarization, but is not shown in FIG. 2.

A "wave" comprises a curve covering at least one complete component (P, Q, R, S and/or T). According to naming conventions accepted by most cardiology workers, a time increment with a straight line amplitude extending between two consecutive signals, for example, from the end of an S wave to the beginning of an immediately following T wave, is referred to as a "segment." A time increment that includes at least one wave, with a graph that is at least partly curved, for example, from the beginning of a Q wave to the end of an S wave, is referred to as an "interval." Herein, a "wave," such as a P wave, will refer to the curvilinear graph (only) portion of a time interval, not including the associated time segment. A "wave", of a "segment," and of an "interval" are illustrated in FIG. 3.

A P-Q time interval, normally of length $\Delta t(p\text{-}q) \approx 120\text{-}200$ msec, represents conduction time from initiation of atrial repolarization until initiation of ventricular depolarization, which is conventionally measured from the start of the P wave to the start of the Q wave.

Where the ICS is diseased or is affected by presence of Digitalis, the P-Q time interval may lengthen as the pulse rate decreases; a prolonged P-Q interval, substantially beyond 200 msec in length, is often evidence of atrio-ventricular block. An abnormally short P-Q interval, substantially below 120 msec in length, is often associated with hypertension and/or with paroxysms of tachycardia. The P-Q interval can also be shortened where the impulse originates in the AV node, or other atrial locations, rather than in the SA node.

The QRS time interval, normally of temporal length $\Delta t(q\text{-}t)$ z, 50-100 msec, represents conduction time from initiation of ventricular depolarization until the end of ventricular depolarization, and includes spread of the electrical impulse through the ventricular muscle. The P wave signal is normally gently rounded, not pointed or notched, and has a temporal length $\approx$ 50-110 msec. One or more of the P, Q, R, S and/or T peaks may be inverted in FIG. 2, depending upon electrode placement. A QRS interval greater than about 120 msec in temporal length often indicates ventricular arrhythmia or a block of one of the bundles.

Normally, an S-T segment amplitude is approximately equal to a P-Q segment amplitude. The amplitude of the S-T segment, relative to the baseline (e.g., elevated or depressed), and the shape of the T signal are often of interest. The T signal is normally rounded and slightly asymmetrical. Presence of a sharply pointed or grossly notched T signal may indicate presence of myocardial infarction (pointed segment) or of pericarditis (notched segment).

In some subjects, a beat (a single PQRST cycle) is sometimes missed. This arises from the particular physiology of that subject and has not (yet) been shown to arise unambiguously from the presence of high stress in that subject.

In normal ECG practice, ten or more electrodes including a ground electrode, are attached to the subject at selected, spaced apart locations. A chart of each PQRST cycle is printed separately on a 1 mm×1 mm grid, with 1 mm (horizontal) representing 40 msec (0.04 sec time increment) and 1 mm (vertical) representing 0.1 milliVolts (mV amplitude). An upper limit on amplitude is usually 20-30 mm (2-3 mV).

ECG analysis is generally limited to medical diagnostics and to comparison of shifts with the passage of time of ECG parameters of interest. No substantial work has been done applying the ECG results to other areas of interest, such as authentication of an asserted identity of a candidate-person, through analysis of selected ECG results to provide one or more physiologically based biometric indicia associated with the candidate-person. Nor has any substantial use been made of evidence of a malady such as myocardial infarction or pericarditis as a characteristic for verifying the identity of a candidate-person.

What is needed is a method and associated system for measuring one or more (preferably several) statistical parameters associated with PQRST cycle for a candidate person and authenticating, or declining to authenticate, the candidate-person's asserted identity with a reference person, using a comparison of the measured statistical parameter values (biometric indicia) with corresponding reference parameter values. Optionally, the comparisons should be cumulative so that the biometric indicia test can be made progressively more demanding, to minimize likelihood of commission of a type I error (positive result is false) and/or to balance the likelihoods of commission of a type I error and commission of a type II error (negative result is false) in these comparisons. These comparisons should also allow for possible changes with passage of time of PQRST cycle characteristics for a candidate-person. Preferably, evidence of presence of a malady in a reference person should be available for biometric use in comparison of a candidate person with this reference person.

SUMMARY OF THE INVENTION

These needs are met by the invention, which provides a method and associated system for authenticating, or declining to authenticate, an identity asserted by a candidate-person (c-p). The PQRST cycles for two distinct persons are likely sufficiently different that a comparison will allow discrimination between these persons, based on differences in models constructed for each of a reference person and a candidate-person. Further, if a reference person is known to have a cardiac-related anomaly, absence of this anomaly in the measured PQRST complex for the candidate-person strongly indicates that the candidate-person is not the reference person, and conversely. Presence of this anomaly in the reference person and in the candidate-person supports, but does not necessarily require, a conclusion that the candidate-person is the reference person.

The original heart PQRST heart signal may include a superimposed non-zero base line signal f(t,base) that arises from voltage drift, noise and other undesirable effects. The original heart signals (reference and observed) are initially processed in order to "normalize" this signal by suppressing low frequency and high frequency components that are irrelevant to the real heart signal. In one approach, low frequency signals, $f \leq f(low)$ (e.g., $f(low)=2$ Hz), and high frequency components, $f \geq f(high)$ (e.g., $f(high)=42$ Hz) are suppressed or removed using Butterworth or other suitable digital filters of tenth order. FIG. 4 schematically illustrates ideal frequency filtering according this approach. This processing removes slow drift and high frequency noise and provides a "normalized" heart signal for which the observed and reference heart signals are reproducible and can be reliably compared with each other. FIGS. 5 and 6 illustrate PQRST time graphs of an original unfiltered heart signal and a filtered signal with low frequency components and/or high frequency components removed.

With removal of an undulating base line signal, the resulting filtered signal in FIG. 6 appears to follow an approximately constant zero base line, as desired. One can achieve somewhat the same results by forming an average baseline signal, using a moving time window and subtracting this average baseline, whose amplitude will change slowly with passage of time. One advantage of use of a digital filtering approach is that removal of the base line contributions is automatic and occurs as each succeeding heart signal is received. Base line contributions are preferably removed before the procedures in FIGS. 7A/7B and 8A/8B/8C for the reference and candidate-person graphs are implemented.

In a first embodiment (enrollment phase), the system receives a sequence of heart electrical action cycles for a known reference person. These cycles are segmented and recorded, and a set S1 of N graphs, numbered $n=1, \ldots, N$, of these reference cycles is formed. K such graphs are randomly chosen ($3 \leq K \leq N$), numbered $k=1, \ldots, K$. A pair of graphs, $v(t;k=k1)$ and $v(t;k=k2)$, is identified for which a first graph comparison metric $\rho 1(k1;k2)$ is a maximum for graphs drawn from the chosen set, and a composite graph, denoted $v(t;k12)$, is formed using data from the graphs $v(t;k1)$ and $v(t;k2)$.

A set S2 of graphs (n) among the N graphs is identified for which a metric value $\rho 1(k12;n)$ is at least equal to a selected threshold value (thr1). The threshold value (thr1) may be chosen so that the set S2 includes a selected fraction g of the N graphs that resemble each other, with g preferably lying in a range of about $0.3 \leq g \leq 0.99$; a higher choice of the threshold value (thr1) will lead to a correspondingly lower value of the fraction g. From each graph in the set S2, a feature vector FV, discussed in Appendix C, is constructed, representing an amplitude and corresponding time position of local maxima and minima of the graph. From the resulting set of feature vectors, a Gaussian mixture model, denoted GMM(S2;ref), is constructed and used as a reference heart cycle model, representing the known reference person, relying upon the fraction g of graphs that resemble each other. Preferably, a Gaussian mixture model, constructed in accord with the article entitled "Maximum Likelihood from Incomplete Data via the EM Algorithm," by Dempster, Laird and Rubin (Trans. Royal Statistical Soc., Vol. 39, Series B, pp. 1-38 (1977), incorporated by reference herein, is used here.

In a second embodiment (verification phase), the system subsequently receives a sequence of heart cycles and associated graphs for a candidate-person (c-p), who asserts an identity with a reference person that is to be verified or refuted. A sequence of N' graphs $v'(t;n';c-p)$, numbered $n'=1, \ldots, N'$, is presented by the c-p, and a set S1' of K' such graphs $v'(t;k';c-p)$ ($k'=1, \ldots, K'; 3 \leq K' \leq N'$) is randomly chosen. A pair of graphs, $v'(t;k'=k1';c-p)$ and $v'(t;k'=k2';c-p)$, is identified for which a metric value $\rho 1(k1';k2')$ is a maximum for graphs drawn from the chosen set 51; and a composite graph, denoted $v'(t;k12';CP)$, is formed using data from the graphs $v'(t;k1')$ and $v'(t;k2')$.

A set S2' of graphs (n') among the N' graphs is identified for which a metric value $\rho 1(k12';n')$ is at least equal to a selected threshold value (thr2). The threshold value (thr2) may be chosen so that the set S2' includes at least a selected fraction g' of the N' graphs that resemble each other, with g' preferably lying in a range $0.3 \leq g' \leq 0.99$. From each graph in the set S2, a feature vector FV' is constructed representing an amplitude and corresponding time position of local maxima and minima of the graph. From the resulting set of feature vectors, a Gaussian mixture model, denoted GMM(S2';rep), is constructed and used to represent the c-p. A second metric, $\rho 2$, referred to as a GMM comparison metric, is provided and applied to compute a second metric value, $\rho 2\{GMM(S2;ref);$ GMM(S2';c-p)}, which compares the reference GMM model with the c-p GMM model. The candidate-person's asserted identity is accepted as likely to be valid if (and, optionally, only if) the second metric value ρ2{GMM(S2;ref);GMM (S2';c-p)} is at least equal to a third selected third threshold value (thr3). If the second metric value ρ2{GMM(S2;ref); GMM(S2';c-p)} is less than a fourth threshold value (thr4), with (thr4)≤(thr3), acceptance of the candidate-person's asserted identity is optionally declined; or one or more further tests of the candidate-person's identity are applied.

DESCRIPTION OF THE INVENTION

Figure 1:
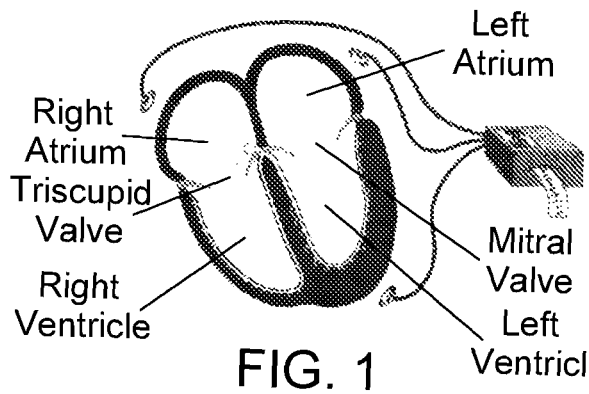
FIG. 1 schematically illustrates a human heart.
Figure 2:
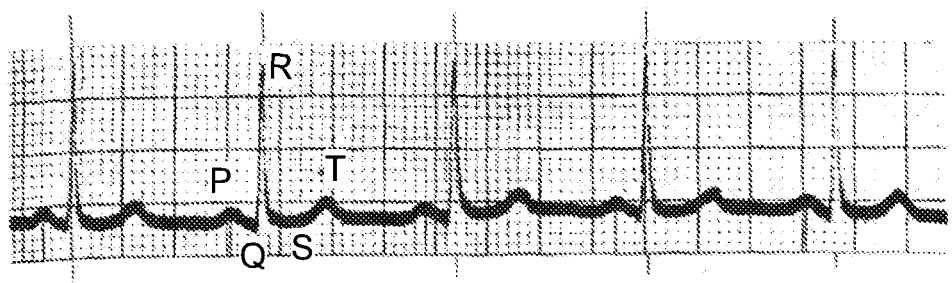
FIG. 2 schematically illustrates a representative PQRST electrical signal complex generated in association with a human heart.
Figure 3:
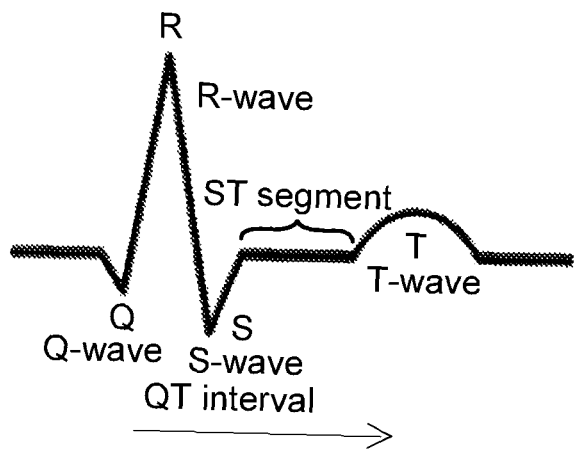
FIG. 3 illustrates "waves", "segments" and "intervals."
Figure 4:
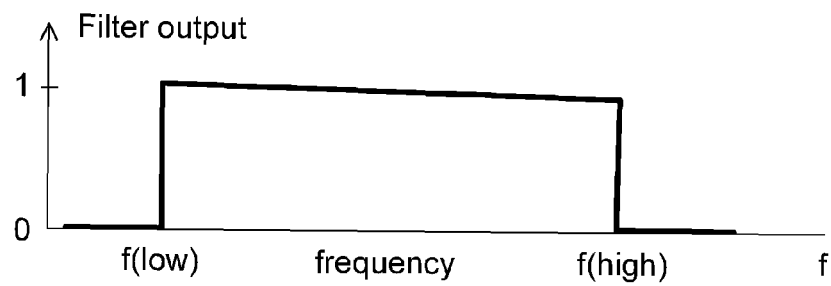
FIG. 4 illustrates ideal frequency filtering of an original heart signal
Figure 5:
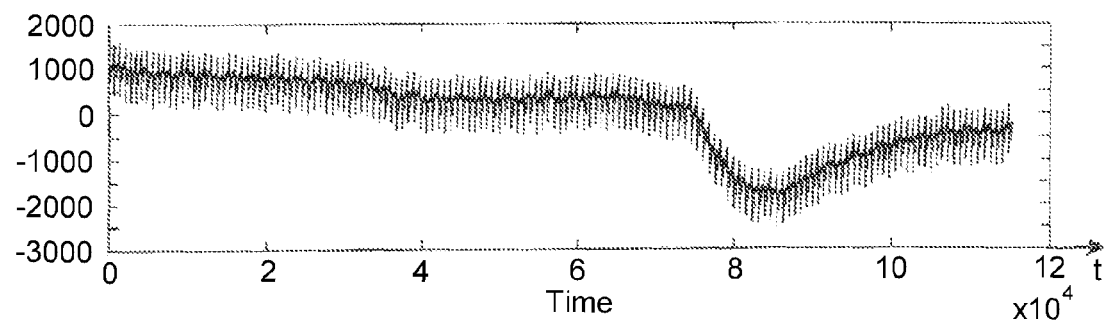
FIGS. 5 and 6 graphically illustrate a result of removal of a base line contribution to an original, unfiltered heart signal.
Figure 6:
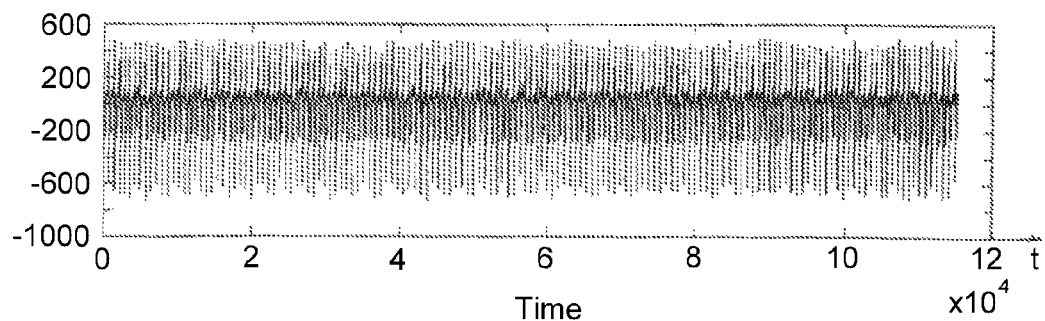
Figure 7A:
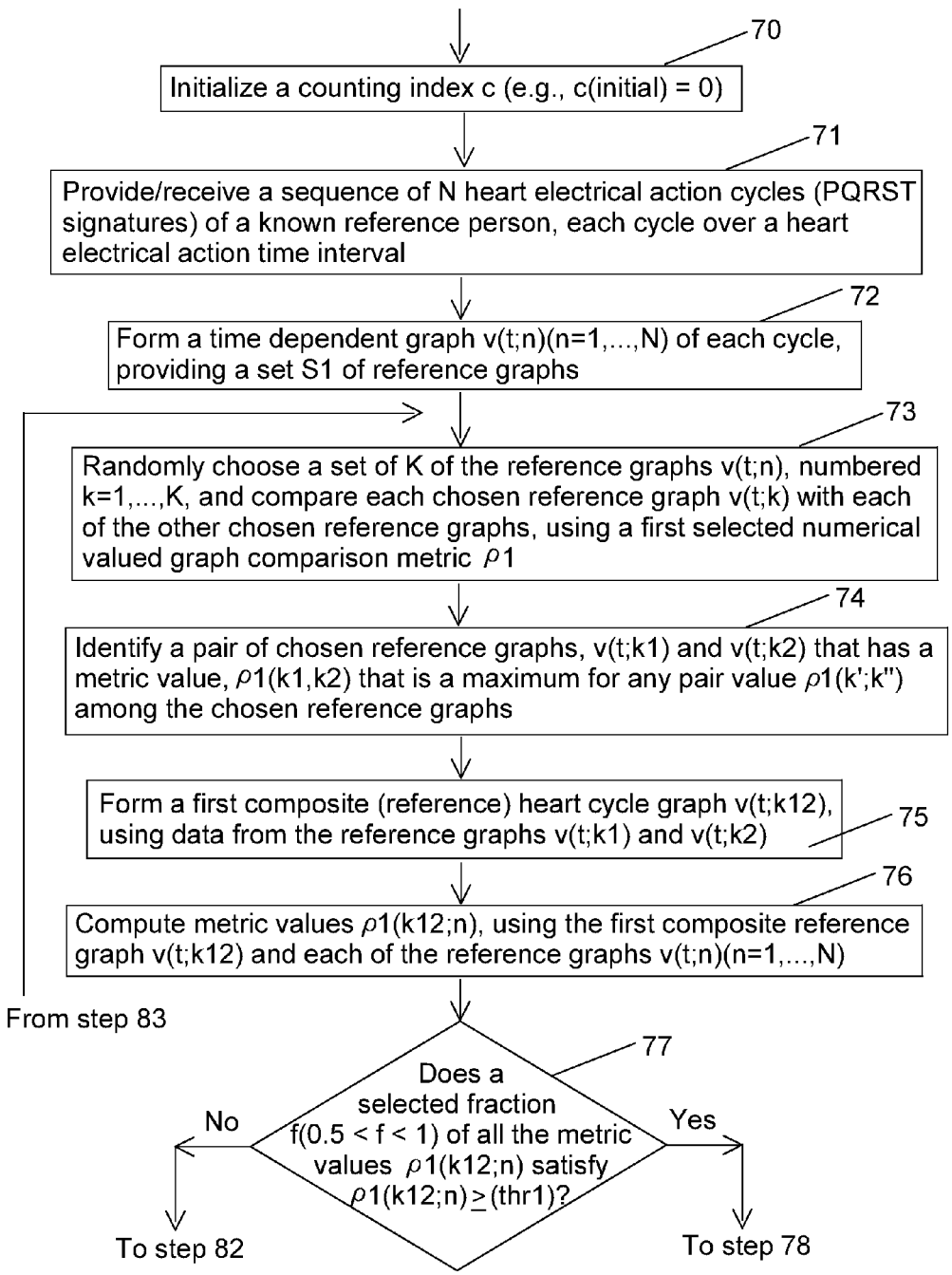
FIGS. 7A/7B and 8A/8B/8C are flow charts illustrating an enrollment phase and an identity verification phase for practicing the invention.
Figure 7B:
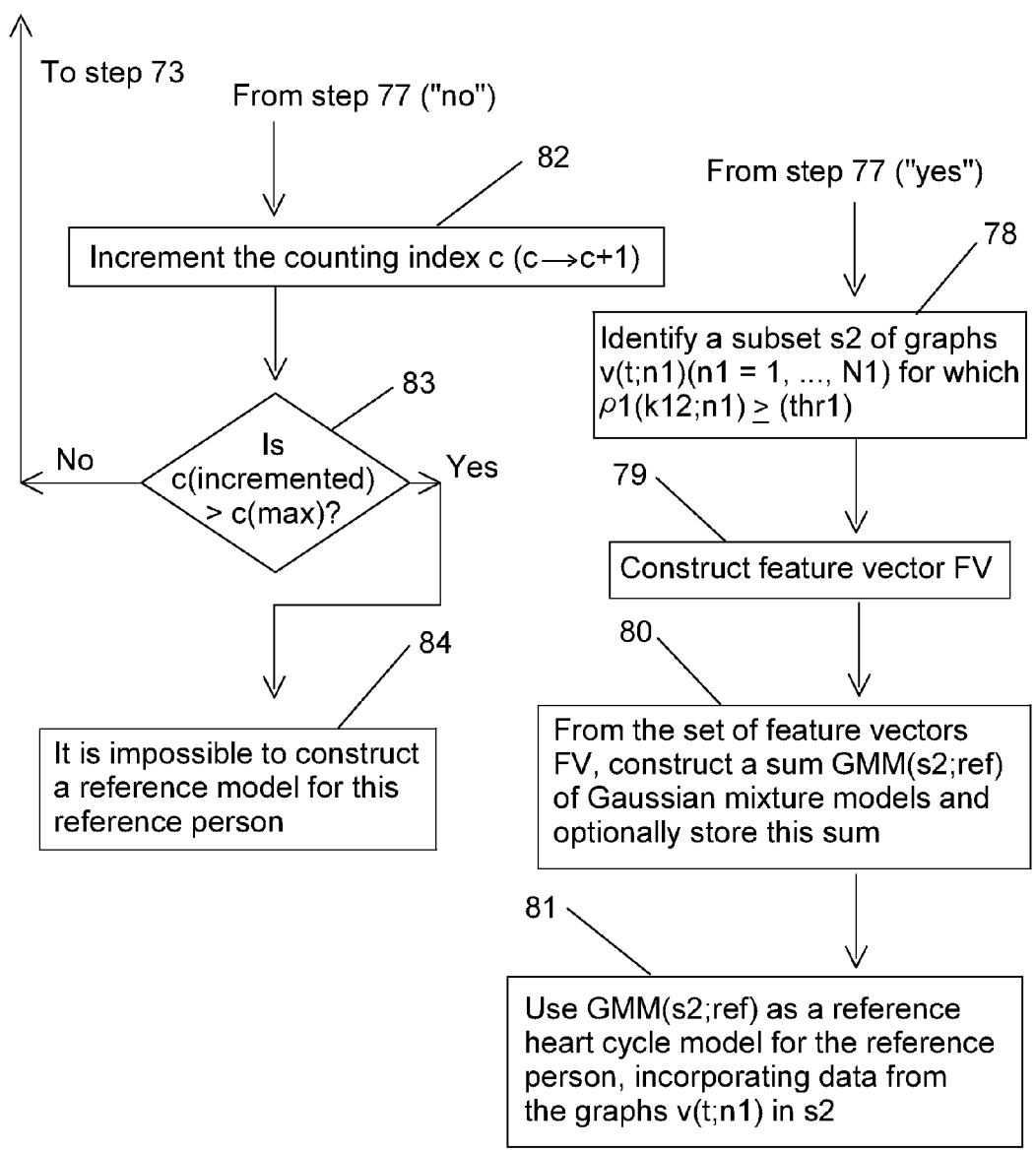

FIGS. 7A/7B are a flow chart illustrating an embodiment of an enrollment phase for practicing the invention. In step 70, a counting index c is initially set equal to 0 (c(initial)=0). In step 71, the system provides or receives and stores a sequence of heart electrical action cycles (sometimes referred to as "PQRST signatures") to create a model for a reference person whose identity is known. Preferably, each cycle covers only one PQRST heart electrical action time interval, and the cycles do not overlap, except optionally at the cycle end points. In step 72, the system forms a time dependent graph v(t;n) for each of N (N≥3) recorded heart electrical action cycles, numbered n=1, . . . , N. In step 73, the system randomly chooses a set of K of the heart cycle graphs (3≤K≤N), numbered k=1, 2, . . . , K, and compares each chosen graph v(t;k) with each other chosen graph, using a first selected, numerical-valued graph comparison metric ρ1.

In step 74 the system identifies a pair, v(t;k1) and v(t;k2), of the chosen reference graphs that has a metric value ρ1(k1,k2) that is as larger as or larger than any other metric value ρ1(k',k") among the K chosen reference graphs. In step 75, the system forms a first composite heart cycle graph v(t;k12), using data from the graphs v(t;k1) and v(t;k2).

In step 76, metric values ρ1(k12;n) are computed for all graphs v(t;n) (n=1, . . . , N) in the set of N graphs. In step 77, the system queries whether at least a selected fraction g (0.5<g<1) of these metric values satisfy ρ1(k12;n)≥(thr1), where (thr1) is a selected first threshold value. Where the answer to the query in step 77 is "yes," a subset S2 of all graphs v(t;n1) (n1=1, 2, 3, . . . ) in the set S1 is identified for which ρ1(k12;n1)≥(thr1), in step 78. Choice of a higher threshold value (thr1) will lead to a correspondingly lower value of the fraction g. Optionally, the threshold value (thr1) may be chosen in a range of about (thr1)=(0.3-0.99) ρ1(k1, k2). Alternatively, the criterion for graph resemblance may be ρ1'(k12;n1)≤(thr1'), for another selected threshold value (thr1'), with ρ1'(k1,k2)≤(thr1'), for an alternative first graph comparison metric ρ1'.

For each graph in the set S2, a feature vector FV is constructed, for example, as in Appendix C, representing the amplitude and corresponding time position of local maxima and minima of the graph v(t;n1) in the set S2, in step 79. From the resulting set of feature vectors, a sum of Gaussian mixture model (Appendix B), denoted GMM(S2;ref), is constructed and optionally stored, in step 80, and used in step 81 as a reference heart cycle model, representing the known reference person, incorporating data from the graphs v(t;n1) in S2. Preferably, a Gaussian mixture model, constructed in accord with the article entitled "Maximum Likelihood from Incomplete Data via the EM Algorithm," by Dempster, Laird and Rubin (op. cit.), is used here.

Where the answer to the query in step 77 is "no," the system, in step 82, increments the counting index c (c→c+1). In step 83, the system inquires if the incremented index c satisfies c>c(max), where c(max) is a selected maximum index value (e.g., c(max) between 20 and 100). If the answer to the query in step 83 is "no," the system returns to step 73 and repeats steps 73-83. If the answer to the query in step 83 is "yes," the system, moves to step 84 and interprets this condition as indicating that it is impossible to create a reference model for this reference person.

Appendix B sets forth a procedure for construction of a Gaussian mixture model, consisting of a sum of individual Gaussian functions, each having a weight or amplitude, a temporal mean or location of an extreme value (maximum or minimum), and a characteristic width relative to the peak value (proportional to standard deviation of a Gaussian function). A Gaussian mixture is a sum of M Gaussian functions so that the total (maximum) number of parameters or "features" is 3M. A feature vector is formed from these features for each of the graphs v(t;n1), and a model, relying on data from the feature vectors, is formed. A smaller number of features (<3M) may be used to form a feature vector. One result is a probability density function p(x|3M) for feature vector components that correspond to amplitude values, mean values and standard deviation values for M Gaussian functions that together represent the heart action graphs in different time sub-intervals of a heart action cycle.

Figure 8A:
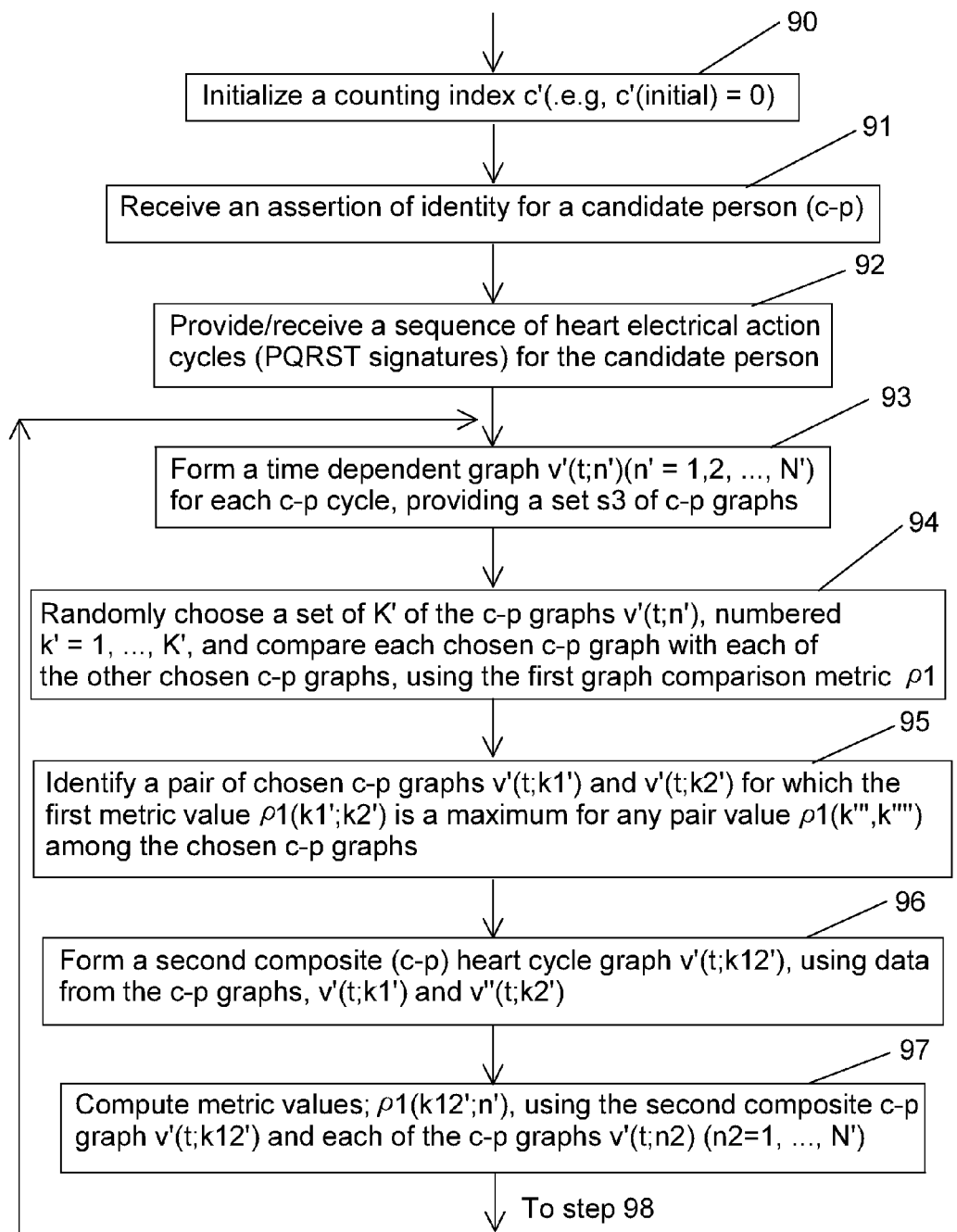
Figure 8B:
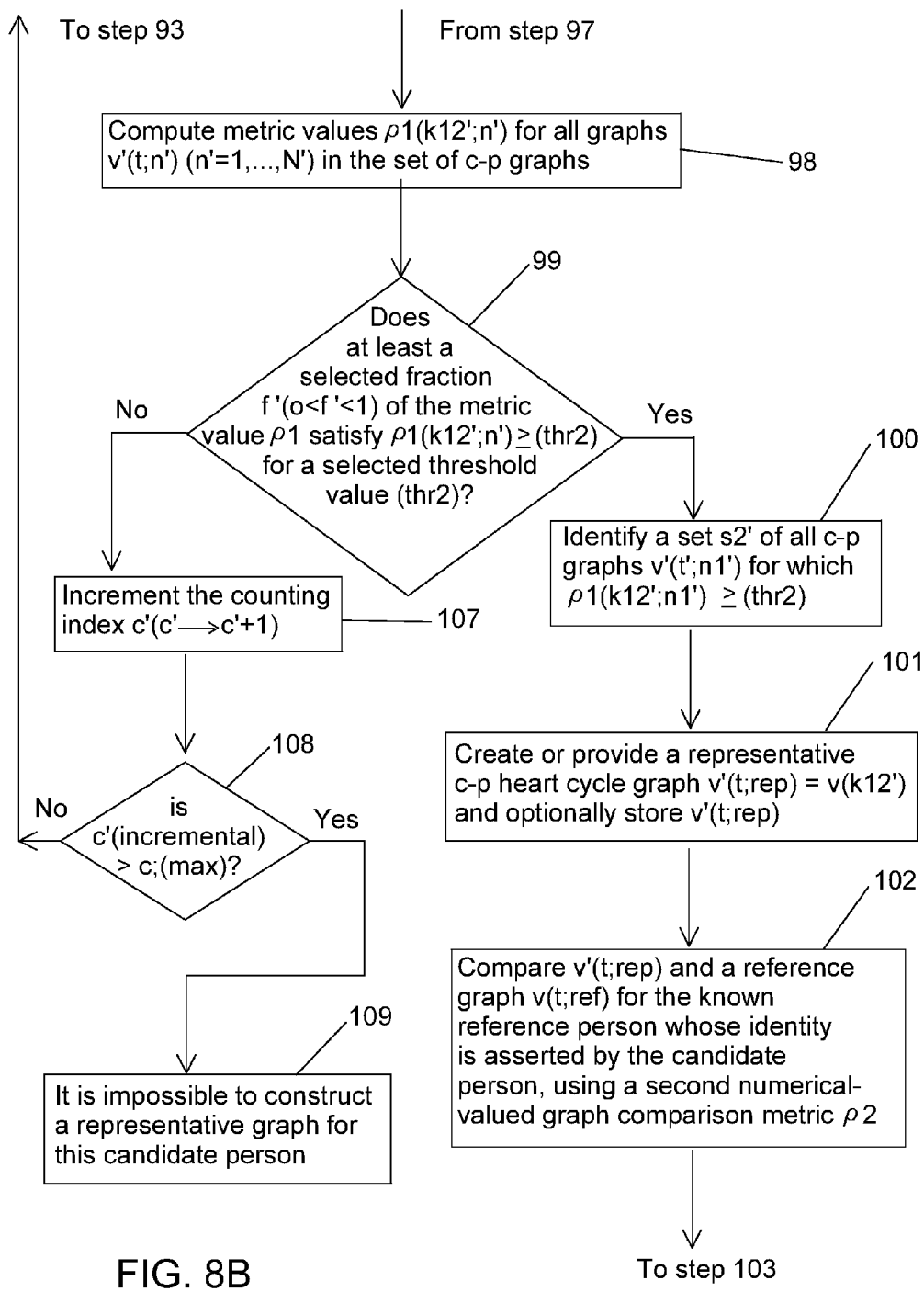
Figure 8C:
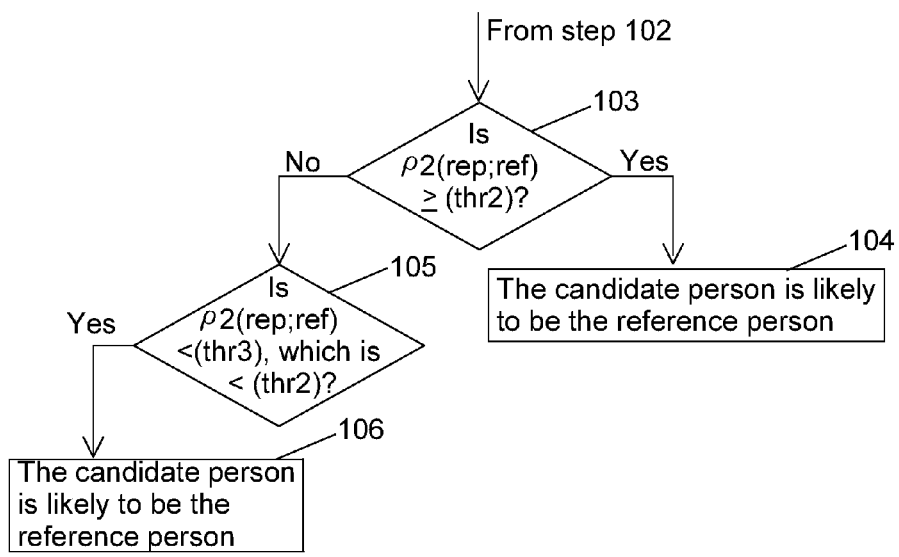

FIGS. 8A/8B/8C are flow charts illustrating an embodiment of an identity verification phase for practicing the invention. In step 90, the system sets an initial value of a counting index c' (e.g., c'(initial)=0). In step 91, the system receives an assertion of an identity for a candidate-person. In step 92, the system provides or receives and records a sequence of heart electrical action cycles or PQRST signatures for the candidate-person. In step 93, the system forms a heart cycle graph v'(t;n') for each of a set of N' (N'≥3) of the reference heart electrical action cycles, numbered n'=1, . . . , N', presented by the candidate-person. Preferably, the cycles do not overlap, except optionally at the cycle end points.

In step 94, the system randomly chooses a set of K' of the c-p heart cycle graphs (3≥K'≥N'), numbered k'=1, 2, . . . , K', and compares each chosen graph v'(t;k') with each of the other chosen c-p graphs, using the first graph comparison metric ρ1. In step 95, the system identifies a pair of chosen c-p graphs, v'(t;k1') and v'(t;k2') among the chosen graphs for which the first metric value ρ1(k1';k2') is at least as large as, or larger than, any other metric value ρ1(k''',k'''') among the K' chosen graphs. In step 96, the system forms a composite c-p heart cycle graph v'(t;k12'), using data from the c-graphs v'(t;k1') and v'(t;k2').

In step 97, metric values ρ1(k12';n') are computed for all graphs v'(t;n') (n'=1, . . . , N') in the set of N' c-p graphs. In step 98, the system determines if at least a selected fraction g '(0.5<f'<1) of these metric values satisfy ρ1(k12';n')≥(thr2), where (thr2) is a selected second threshold value. Where the answer to the query in step 98 is "yes," a subset S2' of all c-p graphs v'(t;n1') is identified for which ρ1(k12';n1')≥(thr2), in step 99. Choice of a higher threshold value (thr2) will lead to a correspondingly lower value of the fraction g'. Optionally, the threshold value (thr2) may be chosen in a range of (thr2)= (0.3-0.99) ρ1(k1',k2'). Alternatively, the criterion for graph resemblance may be ρ1'(k12';n1')≤(thr2'), for another selected threshold value (thr2'), with ρ1'(k1',k2')≤(thr2'), for an alternative first graph comparison metric ρ1'.

Where the answer to the query in step 98 is "yes," the system, in step 100, creates or provides a representative c-p heart cycle graph, v'(t;rep)=v'(t;k12'), and optionally stores the representative graph v'(t;rep) for this candidate-person.

In step 101, the system compares the representative graph v'(t;rep) for the candidate-person and a reference graph v(t; ref) associated with the known reference person whose identity is asserted by the candidate-person, using a second, numerical-valued graph comparison metric ρ2(rep;ref). The first and second metrics, ρ1 and ρ2, may be different or may be the same. Where ρ2(rep;ref)≥a selected second metric threshold value (thr2), the system, in step 102, interprets this condition as indicating that the candidate-person is likely to be the reference person whose identity is asserted by the candidate-person. Where ρ2(rep;ref)<a selected third metric threshold value (thr3), with 0<(thr3)≤(thr2), the system interprets this condition, in step 103, as indicating that the candidate-person is not likely the reference person whose identity is asserted by the candidate-person.

Where the answer to the query in step 98 is "no," the system, in step 104, increments the index c' (c'→c'+1). In step 105, the system inquires whether the incremented index c' satisfies c'>c'(max), where c'(max) is a selected maximum index value (e.g., c'(max) between 20 and 100). If the answer to the query in step 105 is "no," the system returns to step 93 and repeats steps 93-105. If the answer to the query in step 105 is "yes," the system, in step 106, interprets this condition as indicating that it is impossible to create a representative graph for this candidate-person. Optionally, the candidate-person's assertion of identity may be rejected.

The first graph comparison metric ρ1(or ρ1') is optionally configured to compare values at corresponding times for a chosen pair of heart cycle graphs, indexed as (k''',k'''') (k''', k''''=1, . . . , K; k'''≠k''''), of the K graphs, or of the graphs k12 and n, at each of a sequence of spaced apart time points, $t=t_m$, at which the corresponding pair (k''',k'''') of heart cycle values $v(t_m;k)$ were provided and/or received, measured from a selected initial time value for each of the pair (k''',k'''') of heart cycles. A suitable first metric ρ1 is a normalized correlation function, defined as $$\rho1(k''',k'''') = \operatorname{corr}(k''',k'''')/\{\operatorname{corr}(k''';k''')\operatorname{corr}(k'''';k'''')\}^{1/2} \quad (1)$$

$$\operatorname{corr}(k''', k'''') = \sum_{m=1}^{M} w(t_m) v(t_m; k''')^* \hat{v}(t_m; k''''), \quad (2)$$

where * indicates a suitable conjugation operation and $w(t_m)$ is a selected non-negative weight value. In this approach, one requires that $$\rho1(k''',k'''')-(\text{thr1})=D1 \geq 0, \quad (3)$$

in order that the graphs corresponding to $\{v(t_m;k''')\}_n$ and $\{v(t_m;k''')\}_m$, sufficiently resemble each other.

A suitable version of an alternative first metric ρ1' is a sum of differences, $$\rho1'(k''', k'''') = \sum_{m=1}^{M} w'(t_m) |v(t_m, k'''')/V(k''') - v(t_m;k'''')/V(k'''')|^{q'}, \quad (4)$$

$$V(k) = \sum_{m=1}^{M} |v(t_m; k)|, \quad (5)$$

where $w'(t_m)$ is a selected non-negative weight value (e.g., uniform weights), q' is a positive exponent number, and $\{v(t_{m;}k)\}_m$, is a selected sequence of heart cycle values, associated with a known reference person. In this approach, one requires $$\rho1'(k''',k'''')-(\text{thr1}')=D2 \leq 0 \quad (6)$$

in order that the graphs corresponding to $\{v(t_m;k'')\}_m$ and $\{v(t_m;k'')\}_m$, sufficiently resemble each other. The two inequalities in Eqs. (3) and (6) can be expressed in a single inequality, ρ1(k';k'')−(thr1)=D1, with D1≥0 or D1≤0, respectively.

A second metric value ρ2 may also be defined according to Eqs. (1) and (2), or alternatively according to Eqs. (4) and (5), with possibly-different choices of weight values $w''(t_m)$ and/or possibly a different choice of an exponent index q', $$\rho2(\text{rep};\text{ref})=\operatorname{corr}(\text{ref};\text{rep})/\{\operatorname{corr}(\text{ref};\text{ref})\operatorname{corr}(\text{rep};\text{rep})\}^{1/2}, \quad (7)$$

$$\operatorname{corr}(rep; ref) = \sum_{m=1}^{M} w(t_m) v(t_m; ref) * \hat{v}(t_m; rep). \quad (8)$$

Where $$\rho2(\text{rep};\text{ref})-(\text{thr2})=D2 \leq 0 \quad (9)$$

is satisfied for a selected second metric threshold value (thr2), this condition is interpreted as indicating that the candidate-person is likely to be the reference person.

A suitable version of an alternative second metric ρ2' is a sum $$\rho2'(rep; ref) = \sum_{m=1}^{M} w'(t_m) |v(t_m; ref)/V(ref) - v'(t_m;rep)/V'(rep)|^{q'}, \quad (10)$$

$$V(ref) = \sum_{m=1}^{M} |v(t_m; ref)|, \quad (11)$$

$$V'(rep) = \sum_{m=1}^{M} |v'(t_m; rep)|, \quad (12)$$

where $w'(t_m)$ is a selected non-negative weight value, q' is a selected positive number, and $\{v(t_m,\text{rep})\}_m$ and $\{v(t_m,\text{rep})\}_m$ are selected sequences of heart cycle values, the latter being associated with the candidate-person. Where $$\rho2'(\text{rep};\text{ref})-(\text{thr2}')=D2' \leq 0 \quad (13)$$

is satisfied for a selected third metric threshold (thr3), with 0<(thr3)≤(thr2), the system interprets this condition as indicating that the candidate-person is not likely the reference person whose identity is asserted by the candidate-person.

A reference heart cycle graph can be formed using data from a pair of graphs, (k=k1, k=k2), that have a maximum first metric value ρ1(k1,k2). One suitable reference graph is $$\rho 1(k1,k2)=\max_{k',k''}\{\rho 1(k''',k'''')\} \quad (14)$$

$$v(t;\text{ref})=\text{Avg}_{k1,k2}\{v(t;k1),v(t;k2)\}, \quad (15)$$

where Avg is a point-by-point averaging operation, such as $$\text{Avg}\{v(t;k1),v(t;k2)\}=\{v(t;k1)+v(t;k2)\}/2, \quad (16\text{-}1)$$

$$\text{Avg}\{v(t;k1),v(t;k2)\}=\text{sgn}\{v(t;k1)+v(t;k2)\}|v(t;k1)\cdot v(t;k2)|^{1/2}, \quad (16\text{-}2)$$

$$\text{Avg}\{v(t;k1),v(t;k2)\}=v(t;k1)+v(t;k2)-\text{sgn}\{v(t;k1)+v(t;k2)\}|v(t;k1)\cdot v(t;k2)|^{1/2}. \quad (16\text{-}3)$$

The threshold value (thr1) may be in a range, such as (0.3-0.99) Max{ρ1(k1,k2)}.

Another suitable reference heart cycle graph can be formed from a pair of graphs, (k=k3,k=k4), that have a minimum first metric value ρ1'(k3,k4), with the same expression v(t;ref,) as in Eq. (15) and in the examples in Eqs. (16-1), (16-2) and (16-3):

$$\rho 1'(k3,k4)=\min_{k',k''}\{\rho 1'(k',k'')\} \quad (17)$$

$$v(t;\text{ref})=\text{Avg}\{v(t;k3),v(t;k4)\}, \quad (18)$$

The threshold value (thr1') may be a selected fraction (e.g., 1-3 times the minimum value ρ1'(k3,k4). The considerations in Eqs. (14)-(18) may also be applied to formation of the representative graph values v(t;rep).

The representative candidate-person heart cycle graph may be computed by averaging the heart cycle graphs (k'''=k1', k''''=k2') for the candidate-person. The heart rate-based corrections of Bazett/Fredericia (Δt(q-t)) and Danter-Carrothers (Δt(p-r)), discussed in Appendix A, are optionally applied to provide an HR-corrected average heart cycle graph for the known reference person and for the candidate-person, as defined on a time interval having a selected length (e.g., Δt=600 msec) within the graph. A biometric feature vector is extracted from the HR-corrected average heart cycle graph for the candidate-person, as discussed in Appendix C, of dimension d=18, or smaller if desired.

A sequence of PQRST cycles associated with a reference person or a candidate-person will vary from one cycle to another, which requires a standardized determination of where a cycle "begins." One approach focuses on a beginning of a P-wave, which is taken to be a time near the beginning of a cycle where the signal amplitude of the P-wave portion first diverges significantly from a zero-amplitude (isoelectric) baseline. One problem encountered here is that of distinguishing between a non-zero P-wave amplitude that is merely noise, from a non-zero signal amplitude that is the beginning of a true P-wave.

One approach adopted here focuses, not on a "beginning" of a P-wave, but on an analog of a level crossing, sometimes referred to as a zero crossing. A time derivative of the PQRST signature signal amplitude U(t;k) is squared for each of a sequence of times $\{t_n(k)\}_n$ for each cycle m, and a time, t=t(k;max) is determined for each cycle for which U(t))² is a maximum, $$t(k0;\max)=\{t_n(m)|(U(t)^2 \text{ is maximum at } t=t(k0)\}. \quad (19)$$

A squared level value L, such as $$L=h\max\{|U(t)^2\}, \quad (20)$$

Figure 9:
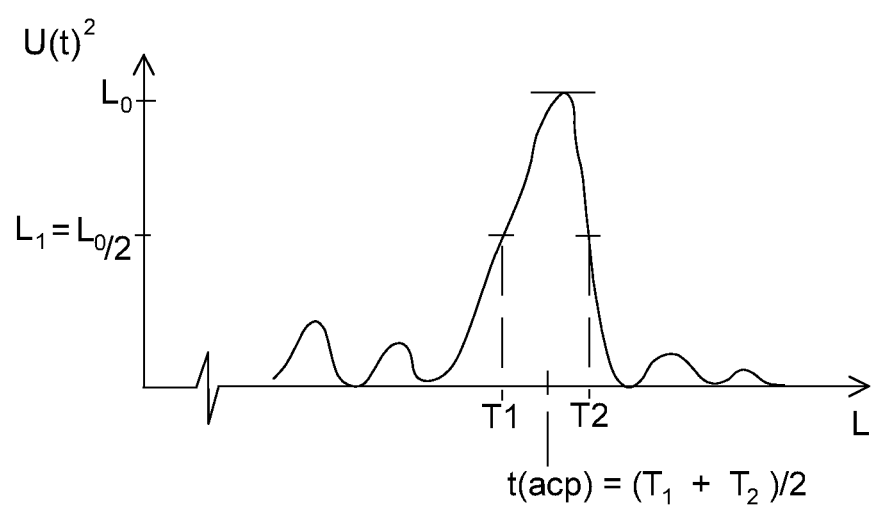
FIG. 9 illustrates estimation of an anchor central point (acp).

(e.g., h=0.2 or 0.5 or 0.6) and a minimum first time value, t=T1, and a maximum second time value, t=T2 (>T1), are estimated for which $$T1\leq t(k0)\leq T2, \quad (21)$$

$$(U(t)^2(t=T1)=U(t)^2(t=T2)=L, \quad (22)$$

as illustrated in FIG. 9; t=T1 is the largest time value, less than t(k0), for which U(t)²(t=T1) has the value L, and t=T2 is the smallest time value greater than t(k0) for which U(t)²(t=T2) has the value L. The time value t=t(k0) will be located near, but not necessarily coincident with, a time value for which the R-wave achieves its largest amplitude. A mid-point time value, t=t(acp)=(T1+T2)/2, will be referred to herein as an "anchor central point" (acp) for a heart cycle and is optionally used in compensating for heart beat rates that differ from HR=60/min.

A time interval including one heart cycle is now divided into two (or three) sub-intervals, relative to the acp for the cycle:

$$Ia: t(\text{acp})-250 \text{ msec}<t\leq t(\text{acp}), \quad (23A)$$

$$Ib: t(\text{acp})\leq t<t(\text{acp})+350 \text{ msec}. \quad (23B)$$

Where three sub-intervals are provided for a cycle, the time division is often determined as $$I1: t(\text{acp})-250 \text{ msec}\leq t\leq t(\text{acp})-70 \text{ msec};$$

$$I2: t(\text{acp})-69 \text{ msec}\leq t\leq t(\text{acp})+110 \text{ msec};$$

$$I3: t(\text{acp})+111 \text{ msec}\leq t\leq t(\text{acp})+250 \text{ msec}.$$

The time t=t(acp) corresponds approximately to an averaged time for maximum slope of the R-wave component of a collection of cycles. The time interval Ia will include all of the P-wave (if present), all of the Q-wave (if present) and most of the R-wave that precedes t(acp), for most cycles; and the time interval Ib will include the remainder of the R-wave, all of the S-wave (if present) and all of the T-wave (if present) for most cycles. The time intervals Ia and Ib, 600 msec in total length, determine the time intervals for each heart cycle used in the computations of correlations, weighted differences and averages formed in Eqs. (1)-(18).

The representative heart cycle graph of values in each of the three time intervals, I1, I2 and I3, for a PQRST signature can be constructed, using a Gaussian mixture (sum) of M=2 or M=3 Gaussian functions, with each Gaussian, time dependent function having as many as three adjustable parameters: for example, maximum amplitude, time corresponding to mean value (maximum magnitude), and standard deviation. A procedure for determination of the parameters for the Gaussian mixture is set forth in Appendix C.

A feature vector, having parameter values drawn from the adjustable parameters of the Gaussian mixture, will have Q vector components, with Q≤18; in one instance, Q=14 is preferred.

Characterization.

The foregoing procedure includes: (i) an enrollment phase, wherein a reference graph(s) of heart electrical action for one or more known reference persons is created for subsequent comparison with a representative graph of heart electrical action presented by a candidate-person; and (ii) an identity verification phase, wherein the representative graph presented by the candidate-person is compared with one or more extant reference graphs, to confirm or refute the candidate-person's assertion of identity with a reference person. The approach is strongly non-parametric; a reference graph is constructed using two or more graphs for the reference person that resemble each other and that resemble a large fraction of other graphs associated with the known reference person. The system takes account of the possibility that no composite graph, formed from one or two graphs that most closely resemble each other, may adequately characterize heart electrical action for the known reference person. In the verification phase, heart electrical action graphs presented by the candidate-person are examined to estimate whether a composite graph, formed from the graphs presented, adequately characterizes heart electrical action for the candidate-person. Identity of the candidate-person with the reference person is confirmed if (1) a graph comparison metric, applied to the reference and representative graphs, has a value in a selected range and (2) the reference person graph and the candidate-person graph are both sufficiently well characterized in the respective populations from which they are drawn. Use of non-parametric comparisons (i) ensures that no heavy emphasis is imposed on having adequate (non-sparse) statistical data for such purpose, and (ii) facilitates comparisons where the graphs presented by the candidate person include a relatively large fraction of PQRST signatures with what appears to be pathological behavior.

Appendix A

Heart Cycle Correction Based on Overall Heart Rate

Figure 10:
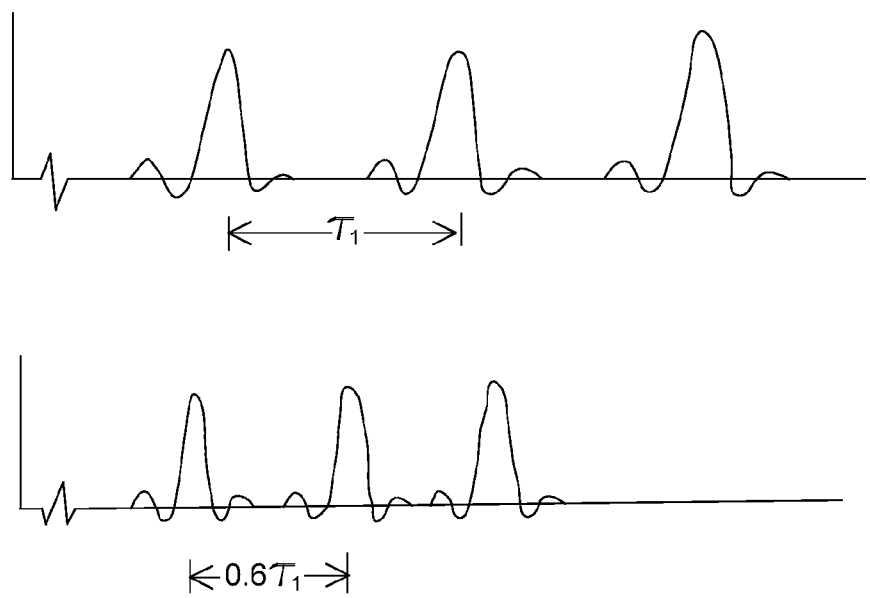
FIG. 10 illustrates contraction and expansion of time scale with heart rate.

In 1920, Bazett and, separately, Fredericia proposed an empirical relation between resting heart rate HR and a length of a QT interval. A corrected QT interval length, denoted $\Delta QTc$, is observed to be approximated as $$\Delta QT_{corr}(\text{msec}) = \Delta QT0\{HR/60\}^{1/2} \text{ (Bazett)}, \quad (A\text{-}1)$$

$$\Delta QT_{corr}(\text{msec}) = \Delta QT0\{HR/60\}^{1/3} \text{ (Fredericia)}, \quad (A\text{-}2)$$

where $\Delta QT0$ is the observed and uncorrected QT interval length for a subject with resting heart rate HR, normally in a range 40-120 beats per minute (bpm). The corrected QT length is reduced, relative to the uncorrected QT length, when the heart beat rate is less than 60 bpm, and inversely. FIG. 10 illustrates a contraction in time scale, for HR=120 bpm (>60 bpm) and illustrates an expansion in time scale, for HR=40 bpm (<60 bpm), for the QT time interval.

An analogous correction, $\Delta PRc$, expressed as a linear regression, for a PR length with a resting heart rate differing from 60 bpm has been proposed by Danter and Carruthers (Brit. Jour. Clinical Pharmacol. Vol. 30 (1990) pp 490-492) as $$\Delta PR_{corr}(\text{msec}) = 195.36 - 0.384 \cdot HR = \Delta PR0 \cdot \{\Delta PR_{corr}/\Delta PR0\} \quad (A\text{-}3)$$

FIG. 10 also illustrates contraction of the PR time interval and expansion of the time interval, for HR=120 bpm and for HR=40 bpm. Where HR differs from 60 bpm, the time interval I and the time interval II are each expanded or contracted to corrected time intervals as shown, determined by the relationships $$I (\text{corr}): -250 \cdot \alpha \text{ (msec)} \leq t \leq t(\text{acp}), \quad (A\text{-}4)$$

$$II (\text{corr}): t(\text{cap}) \leq t \leq 350 \, \beta \text{ (msec)}, \quad (A\text{-}5)$$

$$\alpha = \{\Delta PR_{corr}/\Delta PR0\}, \quad (A\text{-}6)$$

$$\beta = \{\Delta QT_{corr}/\Delta QT0\}, \quad (A\text{-}7)$$

The (uncorrected) reference graph v(t;ref) and the (uncorrected) representative graph v(t;rep) are replaced by corrected graphs with appropriately expanded or corrected time, according to $$v(t;\text{ref})_{corr} = v\{t(\text{acp}) - \alpha(t(\text{acp}) - t;\text{ref})\} \, (-250 \text{ (msec)} \leq t \leq t(\text{acp})). \quad (A\text{-}8)$$

$$v(t;\text{ref})_{corr} = v\{t(\text{acp}) + \beta(t - t(\text{acp});\text{ref})\} \, (t(\text{acp}) \leq t \leq 350 \text{ (msec)}), \quad (A\text{-}9)$$

$$v(t;\text{rep})_{corr} = v\{t(\text{acp}) - \alpha(t(\text{acp}) - t;\text{rep})\} \, (-250 \text{ (msec)} \leq t \leq t(\text{acp})), \quad (A10)$$

$$v(t;\text{rep})_{corr} = v\{t(\text{acp}) + \beta(t - t(\text{acp});\text{rep})\} \, (t(\text{acp}) \leq t \leq 350 \text{ (msec)}). \quad (A11)$$

The corrected graph values $v(t;\text{ref})_{co}$, and $v(t;\text{rep})_{corr}$, are to be used in place of $v(t;\text{ref})$ and $v(t;\text{rep})$, respectively, in the preceding.

Appendix B

Determination of Optimum Gaussian Mixture Model Parameters

The representative heart cycle graph of values in each of the three time intervals, I1, I2 and I3, for a PQRST signature can be constructed, using a Gaussian mixture (sum) of M Gaussian functions, with each Gaussian, time dependent function being represented as $$G(t;a_i;\mu_i,\sigma) = a_m[2\pi\sigma_m^2]^{1/2} \exp\{-(t-\mu_m)^2/(2\sigma_m^2)\}, \quad (B\text{-}1)$$

where $a_m$ is a weight or amplitude (positive, negative or zero), $\mu_m$ is a time value (mean value) selected for maximum magnitude for the heart electrical action cycle in the time interval m=1, ..., M, and $\sigma_m$ is the associated standard deviation for the time interval m. For a given time interval i, the parameters $a_m$, $\mu_m$ and $\sigma_m$ are chosen jointly to satisfy three minimization criteria with respect to each of these three parameters of an error value $$\varepsilon = \sum_{k=1}^{K} \left| A_i(t_k) - \left\{ \sum_{m=1}^{M} a_m [2\pi\sigma_m^2]^{-1/2} \exp\{-(t_k - \mu_m)^2/(2\sigma_m^2)\} \right\} \right|^q, \quad (B\text{-}2)$$

where $A_i(t_k)$ is a measured amplitude of a variable of interest (e.g., heart electrical voltage developed) in the time interval m=1, ..., M at a measurement time $t=t_k$ (k=1, ..., K) and q is a selected positive number (e.g., q=1 or 2 or ✓17). The computed value of $\epsilon$ is jointly minimized as $$\text{Min}_{param}\{\epsilon\},$$

with respect to each of the parameters $a_m$, $\mu_m$ and $\sigma_m$, for example, by partial differentiation of $\epsilon$ with respect to each of these parameters. The result is a set of 3N coupled homogeneous equations to be solved simultaneously.

A maximum likelihood (ML) method is preferably used to identify the parameters $a_m$, $\mu_m$ and $\sigma_m$ associated with the individual Gaussian functions in Eq. (B-2). A useful discussion of application of an ML method is presented by Douglas Reynolds in "Speaker identification and verification using Gaussian mixture speaker models", Speech Communication, vol. 17 (1995) pp 91-108. These computations are for each of the fraction g of graphs v(t;n) presented for the graphs ("resemblance graphs") that sufficiently resemble each other, according to the criterion $\rho 1(k12;n) \geq (\text{thr1})$. Optionally, the fraction g of these resemblance graphs are divided into Q groups of such graphs (Q≥2), and each group is subjected to a K-means clustering procedure. For further discussion here, it is assumed that Q=1 so that subsequent statistical processing is applied to one collection of the resemblance graphs.

After the optimum parameter values are determined for each of the resemblance graphs, each of the individual resemblance graphs is approximated as $$v(t; n; approx) = \sum_{m=1}^{M} a_m [2\pi\sigma_{mi}^2]^{-1/2} \exp\{-(t-\mu_m)^2/(2\sigma_m^2)\} \quad \text{(B-3)}$$

where M is the number of Gaussian functions used for each resemblance graph (number n). Each such Gaussian function has three parameters (weight or amplitude, temporal location of mean or peak amplitude, and standard deviation) so that 3M parameters are used to approximate each resemblance graph (assumed to have a count of N). Each of the 3M parameters corresponds to a feature. A 3M×3M covariance matrix C=C(w1,w2) is calculated for each pair features (w1,w2) for all the Nf resemblance graphs, and a probability density function $$p(x;3M)=\{2\pi)^{D/2}\|C\|^{3/2}\}^{-1}\exp\{-(x-\mu)(C)^{-1}(x-\mu)^{tr}/2\}, \quad \text{(B-4)}$$

where x and μ are a feature vector and a mean value vector, each having 3M dimensions. Occurrence of the inverse matrix $C^{-1}$ in the exponent in Eq. (B-4) compensates for differences in dimensions and numerical values of the vector components x.

Appendix C

Creation of a Feature Vector for a Reference Person

From each of the fraction g (or more) of the N graphs, one extracts a vector of features, of dimension D (to be specified). A Gaussian mixture model (GMM) is created, from a sum of M Gaussian functions (preferably, M=2 or 3), using an estimate-minimize algorithm corresponding to a known reference person, with M weighting sets $(a_m, \mu_m, s_m)$ (m=1, ..., M) of parameters to be chosen to minimize an error function.

Figure 11:
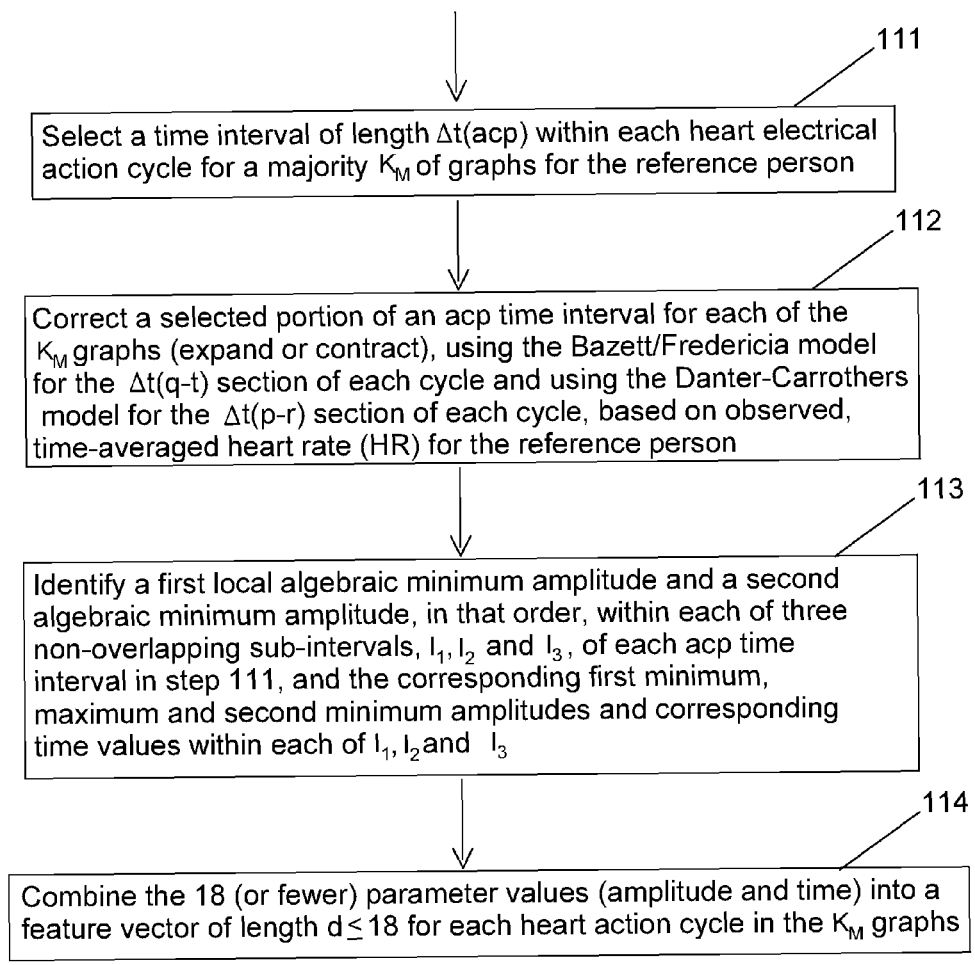
FIG. 11 is a flow chart of a procedure to construct a feature vector.

FIG. 11 is a flow chart illustrating a procedure for constructing a feature vector. In step 111, a time interval of length Δt(acp) (e.g., Δt(acp)=600 msec) is selected within each heart electrical action cycle for the majority $K_M$ of graphs for the reference person. Each such time interval comprises a first time interval I1 of length Δt1 (e.g., Δt1=180 msec), a second time interval I2 of length Δt2 (e.g., Δt2=180 msec), and a third time interval I3 of length Δt3 (e.g., Δt3=240 msec), where consecutive time sub-intervals do not overlap, except optionally at an endpoint.

In step 112, a selected portion of each graph of each measured heart electrical action cycle interval in the $K_M$ graphs is corrected (expanded or contracted), using the Bazett/Fredericia model for a Δt(q-t) section of each cycle and using the Danter-Carrothers model for a Δt(p-r) section of each cycle, based on observed, time-averaged heart rate (HR) for the reference person.

In step 113, the system then identifies a first local algebraic minimum amplitude, a first local algebraic maximum amplitude, and a second algebraic minimum amplitude, in that order, within each of the three sub-intervals (I1, I2, I3), the time values for the corresponding minima, maxima and minima amplitudes, and the corresponding minima, maxima and minima amplitude values, respectively. This provides 18 parameter values for each heart action cycle.

In step 114, this ordered sequence of 18 parameter values forms a feature vector FV of length d≤18 for each heart action cycle in the majority $K_M$ of graphs for the reference person.

Optionally, a feature vector FV (of length d<18) can be formed from the minimum and maximum amplitudes and corresponding time values discussed in the preceding, without application of the heart rate corrections for the Dt(q-t) and/or Dt(p-r) set forth in the Bazett, Fredericia and/or Danter-Carrothers articles.

What is claimed is:

1. A method of authenticating or declining to authenticate an asserted identity of a candidate person (c-p), the method comprising:
   (i) initializing a count index c (c(initial)=0);
   (ii) providing or receiving a sequence of N reference heart electrical action cycles, numbered n=1, ..., N, of a known reference person, and forming a graph v(t;n) representing each provided heart cycle for the reference person;
   (iii) randomly choosing K heart cycle graphs, numbered k=1, 2, ..., K (3≤K≤N) of the provided reference heart cycles, comparing each chosen heart cycle graph v(t;k) with each of the other chosen heart cycle graphs, and identifying a pair of graphs, v(t;k1) and v(t;k2), for which ρ1(k1;k2) is a maximum value, where ρ1 is a first numerical-valued, graph comparison metric that compares two heart cycle graphs, v(t;k') and v(t;k"), and provides a first numerical metric value ρ1(k';k") that is a measure of how closely the two graphs resemble each other;
   (iv) forming a composite heart cycle graph, denoted v(t; k12), using graph values associated with the graphs v(t; k1) and v(t;k2);
   (v) determining when at least a first selected fraction f1 (0.5≤f1<1) of the N heart cycle graphs resemble the composite graph, according to a first condition ρ1(k12; n)−(thr1)=D1, with D1 being always non-negative or always non-positive, where (thr1) is a selected first metric threshold value;
   (vi) when at least the selected fraction f1 of the N heart cycle graphs resemble each other according to the first condition, creating or providing a reference heart cycle graph v(t;ref)=v(t;k12); for the reference person;
   (vii) when at least the fraction f1 of the N heart cycle graphs do not resemble each other, incrementing the count index (c→c+1) to provide an incremented count index;
   (viii) when the incremented count index c is not greater than a selected maximum index value c(max), returning to step (iii) and repeating steps (iii)-(viii) at least once; and
   (ix) when the incremented count index satisfies c>c(max), interpreting this condition as indicating that it is not possible to create a reference heart cycle graph for the reference person.

2. The method of claim 1, wherein said process of comparing two heart cycle graphs comprises:
   (iii-1) forming a correlation of said heart cycle graphs, v(t;k=k1) and v(t;k=k2), according to a relation $$\text{corr}(k1;k2) = \sum_{m=1}^{M} w(t_m)v(t_m;k1)*v(t_{mk};k2),$$

for a selected sequence of times, t=$t_m$ (m=1, ..., M), where w($t_m$) is a selected non-negative weight value and * indicates a conjugation operation;
   (iii-2) computing said first metric value ρ1(k1;k2) according to a relation ρ1(k1;k2)=corr(k1;k2)/{corr(k1;k1)corr(k2;k2)}$^{1/2}$; and (iii-3) when said first metric ρ1 satisfies a condition |ρ1(k1;k2)|−(thr1)=D1≥0, for a selected positive threshold metric value (thr1), interpreting this condition as indicating that the heart cycle graphs v(t;k1) and v(t;k2) resemble each other.

3. The method of claim 2, further comprising:

(iii-4) when ρ1 satisfies |ρ1(k1;k2)|−(thr1)=D1<0, for said threshold metric value (thr), interpreting this condition as indicating that the heart cycle graphs v(t;k1) and v(t;k2) do not resemble each other.

4. The method of claim 1, wherein said process of comparing two heart cycle graphs comprises (iii-1) forming said first metric as a weighted sum of differences of said reference heart cycle graphs, v(t;k=k1) and v(t;k=k2), according to a relation $$\rho(k1;k2) = \sum_{m=1}^{M} w'(t_m)|\{v(t_m;k1)/V(k1)\} - (v(t_m;k2)/V(k2))|^q,$$

$$V(k) = \sum_{m=1}^{M} |v(t_m;k)|,$$

for a selected sequence of times, t=$t_m$ (m=1, ..., M), where w'($t_m$) is a selected non-negative weight value, q is a selected positive number, and {v($t_m$,k)}$_m$ is a selected sequence of heart cycle values, not necessarily associated with said candidate-person; and (iii-2) where ρ1(k1;k2) satisfies |ρ1(k1;k2)|−(thr1')≤0, for a selected positive threshold metric value (thr1'), interpreting this condition as indicating that the heart cycle graphs v(t;k1) and v(t;k2) resemble each other.

5. The method of claim 4, further comprising:

(iii-3) where ρ1(k1;k2) satisfies |ρ1(k1;k2)|−(thr1')>0, for said threshold metric value (thr1'), interpreting this condition as indicating that the heart cycle graphs v(t;k1) and v(t;k2) do not resemble each other.

6. The method of claim 1, further comprising providing said reference heart cycle graph by a process comprising:

defining a maximum first metric value ρ1(k1,k2) as a value equal to max$_{k',k''}$ {ρ1(k',k'')}; and defining said reference heart cycle graph v(t;ref) as Avg$_{k1,k2}$ {v(t;k1), v(t;k2)}.

7. The method of claim 6, further comprising choosing said average function Avg{v(t;k1), v(t;k2)} from the group consisting of:

Avg{v(t;k1),v(t;k2)}={v(t;k1)+v(t;k2)}/2,  (i)

Avg{v(t;k1),v(t;k2)}=sgn{v(t;k1)+v(t;k2)}|v(t;k1)·v(t;k2)|$^{1/2}$, and  (ii)

Avg{v(t;k1),v(t;k2)}=v(t;k1)+v(t;k2)−sgn{v(t;k1)+v(t;k2)}·|v(t;k1)·v(t;k2)|$^{1/2}$.  (iii)

8. The method of claim 1, further comprising:

passing said sequence of N reference graphs through a digital filter that (i) suppresses or removes all frequency contributions to said N reference graphs below a first threshold frequency f(low;1) and (ii) removes or suppresses all frequency contributions to said N reference graphs above a second threshold frequency f(high;2) that is greater than the first threshold frequency f(low;1).

9. The method of claim 8, further comprising choosing said first threshold frequency f(low;1) to be no greater than about 2 Hz.

10. The method of claim 8, further comprising choosing said second threshold frequency f(high;2) to be no less than about 42 Hz.

11. The method of claim 1, further comprising:

(x) initializing a count index c' (c'(initial)=0);

(xi) providing or receiving a sequence of N' heart electrical action cycles, numbered n'=1, ..., N', from a candidate-person (c-p), and forming a graph v'(t;n';c-p) representing each heart cycle for the candidate-person;

(xii) randomly choosing K' c-p heart cycle graphs, numbered k'=1, 2, ..., K' (3≥K'≥N') of the provided c-p heart cycle graphs, comparing each chosen c-p heart cycle graph v'(t;k';c-p) with each of the other chosen c-p heart cycle graphs, and identifying a pair of heart cycle graphs, v'(t;k1';c-p) and v'(t;k2';c-p), for which a value ρ1(k1';k2';c-p) is a maximum value;

(xiii) forming a c-p composite heart cycle graph, denoted v'(t;k12';c-p), using data associated with the graphs v'(t;k1';c-p) and v'(t;k2';c-p);

(xiv) determining when at least a second selected fraction f2 (0.5≤f2<1) of the N' c-p heart cycle graphs resemble the c-p composite graph, according to a second condition ρ1(k12';n')−(thr1')=D1', where (thr1') is a second selected first metric threshold value and D1' is always non-negative or is always non-positive;

(xv) when at least the second selected fraction f2 of the N' c-p heart cycle graphs resemble each other, providing a representative heart cycle graph v'(t;rep)=v'(t;k12';c-p);

(xvi) comparing the representative graph v'(t;rep)=v'(t;k12';c-p) for the candidate-person with said reference graph v(t;ref)=v(t;k12) for said reference person by comparing two graphs, v'(t;rep) and v(t;ref), using a second, numerical valued, graph comparison metric ρ2 that compares two graphs and provides a numerical second metric value ρ2(rep;ref) that is a measure of how closely the two graphs resemble each other;

(xvii) when ρ2(rep;ref) satisfies a third condition ρ2(rep;ref)−(thr2)=D2, where (thr2) is a selected second metric threshold value and D2 is always non-negative or is always non-positive, interpreting satisfaction of the third condition as indicating that the candidate-person is likely to be said reference person;

(xviii) when ρ2(rep;ref) satisfies ρ2(rep;ref)−(thr2)=D2'', where D2'' is negative at least once and is positive at least once, interpreting this condition as indicating that the candidate-person is not likely to be said reference person;

(xix) when at least the second fraction f2 of the N' heart cycle graphs do not resemble each other, incrementing the count index (c'→c'+1), to provide an incremented count index c'(incr);

(xx) when the incremented count index c'(incr) is not greater than a selected maximum index value c'(max), returning to step (xii) and repeating steps (xii)-(xx) at least once; and (xxi) when the incremented count index satisfies c'(incr)>c'(max), interpreting this condition as indicating that it is not possible to create a representative heart cycle graph for the candidate-person.

12. The method of claim 11, wherein said process of comparing two heart cycle graphs comprises:

(xvi-1) forming a correlation of said c-p heart cycle graphs, v'(t;k=k1;c-p) and v'(t;k=k2;c-p), according to a relation $$\operatorname{corr}(k1; k2; c-p) = \sum_{m=1}^{M} w'(t_m) v'(t_m; k1; c-p) * v'(t_{mk}; k2; c-p),$$

for a selected sequence of times, $t=t_m$ (m=1, ..., M), where $w'(t_m)$ is a selected non-negative weight value and * indicates a conjugation operation;

(xvi-2) computing said second metric value ρ2 according to a relation
ρ2(k1;k2;c-p)=corr(k1;k2;c-p)/{corr(k1;k1;c-p)corr(k2;k2;c-p)}$^{1/2}$; and (xvi-3) when ρ2 satisfies a condition |ρ2(k1;k2;c-p)−(thr2)|=D2≥0, for said second metric threshold value (thr2), interpreting this condition as indicating that said c-p heart cycle graphs v'(t;k1;c-p) and v'(t;k2;c-p) resemble each other.

13. The method of claim 11, further comprising:
(xiii-4) where ρ2 satisfies ρ2(k1;k2)−(thr2)=D2<0, for said threshold metric value (thr2), interpreting this condition as indicating that the heart cycle graphs v'(t;k1;c-p) and v'(t;k2;c-p) do not resemble each other.

14. The method of claim 11, wherein said process of comparing two heart cycle graphs comprises
(xvi-1) forming said second metric as a weighted sum of differences of said c-p heart cycle graphs, v'(t;k=k1;c-p) and v'(t;k=k2;c-p), according to a relation $$\rho 2(k1; k2; c-p) = \sum_{m'=1}^{M'} w'(t_{m'}) |\{v'(t_{m'}; k1; c-p1)/V'(k1) - \{v'(t_{m'}, k2; c-p)/V'(k2)\}|^{q'},$$

$$V'(k) = \sum_{m'=1}^{M'} |v'(t_{m'}; k; c-p)|,$$

for a selected sequence of times, $t=t_m$ (m'=1, ..., M'), where $w'(t_{m'})$ is a selected non-negative weight value, q' is a selected positive number, $\{v'(t_{m'};k;c-p)\}_m$ is a selected sequence of heart cycle values, not necessarily associated with said candidate-person, and * indicates a conjugation operation; and (xvi-2) when the second metric ρ2 satisfies ρ2(k1;k2;c-p)−(thr2)≤0, for a selected metric threshold value (thr2), interpreting this condition as indicating that the heart cycle graphs v'(t;k1;c-p) and v'(t;k2;c-p) resemble each other.

15. The method of claim 14, further comprising:
(xvi-3) when ρ2 satisfies ρ2(k1;k2)−(thr2)>0, for said threshold metric value (thr2), interpreting this condition as indicating that said heart cycle graphs v'(t;k1;c-p) and v'(t;k2;c-p) do not resemble each other.

16. The method of claim 11, further comprising providing said representative c-p heart cycle graph by a process comprising:
defining a maximum first metric value ρ1(k1,k2) as a value equal to $\max_{k',k''}\{\rho 1(k',k'')\}$; and
defining said representative c-p heart cycle graph v(t;rep) as $\operatorname{Avg}_{k1,k2}\{v(t;k1), v(t;k2)\}$, where $\operatorname{Avg}_{k1,k2}\{v'(t;k1';c-p), v'(t;k2';c-p)\}$ is an average value for said heart cycle graphs v'(t;k1'c-p) and v'(t;k2';c-p).

17. The method of claim 16, further comprising choosing said average function Avg{v(t;k1';c-p), v(t;k2';c-p)} from the group consisting of:

Avg{v'(t;k'1;c-p),v'(t;k2';c-p)}={v'(t;k1';c-p)+v'(t;k2';c-p)}/2, (i)

Avg{v'(t;k1;c-p),v'(t;k2';c-p)}=sgn{v'(t;k1';c-p)+v'(t;k2';c-p)}|v'(t;k1';c-p)·v'(t;k2';c-p)|$^{1/2}$, and (ii)

Avg{v'(t;k1';c-p),v'(t;k2';c-p)}=v'(t;k1';c-p)+v'(t;k2';c-p)−sgn{v'(t;k1;c-p)+v'(t;k2';c-p)}·|v'(t;k1';c-p)·v'(t;k2';c-p)|$^{1/2}$. (iii)

18. The method of claim 11, further comprising:
estimating a heart beat rate HR, expressed in beats per minute (bpm) or an equivalent time rate for a heart cycle signature, for said reference person and for said candidate-person, where the heart electrical cycle signature comprises a first time interval plus a second time interval that does not overlap the first time interval except possibly at interval end points, where the first time interval ends and the second time interval for said reference person begins approximately at a central point, t=t(acp;ref) and the first time interval and the second time interval for said c-p person begins approximately at a central point, t=t(acp;c-p);
providing a first normalization factor α1, relating a ratio of a length of the first time interval for the HR for said reference person to a first reference length of the first time interval for HR=60 bpm or the equivalent time rate;
providing a second normalization factor α2, relating a ratio of a length of the first time interval for the HR for said c-p person to a second reference length of the first time interval for HR=60 bpm or the equivalent time rate;
providing a third normalization factor β1, relating a ratio of a length of the second time interval for the HR for said reference person to a third reference length of the second time interval for HR=60 bpm or the equivalent time rate;
providing a second normalization factor β2, relating a ratio of a length of the second time interval for the HR for said candidate-person to a fourth reference length of the second time interval for HR=60 bpm or the equivalent time rate;
replacing said reference graph v(t;ref) by a corrected or modified reference graph that is defined as v(t;ref)$_{corr}$=v{t(acp);ref)−α1(t(acp);ref)−t; ref)} (t≤t(acp);ref)).

v(t;ref)$_{corr}$=v{t(acp);ref)+β1(t−t(acp);ref);ref)} (t(acp);ref)≤t); and replacing said representative graph v'(t;rep) by a corrected or modified representative graph that is defined as v'(t;rep)$_{corr}$=v'{t(acp);c-p)−α2(t(acp);c-p)−t; rep)} (t≤t(acp);c-p)), v'(t;rep)$_{corr}$=v'{t(acp);c-p)+β2(t−t(acp);c-p);rep)} (t(acp);c-p)≤t).

19. The method of claim 18, further comprising defining said first normalization factor α=α1 or α=α2 to be α={195.36−0.384(HR)}/{195.36−0.384(60)}.

20. The method of claim 18, further comprising defining said first normalization factor β=β1 or β2 to be β={HR/60}$^r$, where r is a selected fraction in a range ⅓≤r≤½.

21. The method of claim 11, further comprising:
passing said K' c-p heart cycle graphs through a digital filter that (i) suppresses or removes all frequency contributions to said K' c-p heart cycle graphs below a third threshold frequency f(low;3) and (ii) removes or suppresses all frequency contributions to said K' c-p heart cycle graphs above a fourth threshold frequency f(high;4) that is greater than the third threshold frequency f(low;3).

22. The method of claim 11, further comprising choosing said third threshold frequency f(low;3) to be no greater than about 2 Hz.

23. The method of claim 11, further comprising choosing said fourth threshold frequency f(high;4) to be no less than about 42 Hz.

24. A method of authenticating or declining to authenticate an asserted identity of a candidate-person, the method comprising:
- (i) initiating a count index c' (c'(initial)=0);
- (ii) receiving an assertion, by a candidate-person (c-p), that the candidate-person is identical with a specified reference person;
- (iii) providing a sequence of N' heart electrical action cycles of the candidate-person, and forming a c-p heart cycle graph representing each provided c-p heart cycle;
- (iv) randomly choosing K' graphs, numbered k'=1, 2, ..., K' (3≤K'≤N) of the provided c-p heart cycles, and comparing each chosen c-p heart cycle graph with each of the other chosen c-p heart cycle graphs;
- (v) determining whether a majority K'$_M$ of the K' c-p heart cycle graphs resemble each other, according to a second selected numerical-valued, graph comparison metric ρ2 that compares two heart cycle graphs, k'=k'' and k'=k''', and provides a second graph comparison metric value ρ2(k'';k''') for the comparison;
- (vi) when the majority K'$_M$ of the K' c-p heart cycle graphs resemble each other, providing a representative c-p heart cycle graph representing the majority K'$_M$ of the chosen c-p heart cycle graphs;
- (vii) providing a reference heart cycle graph that corresponds to the identity asserted by the candidate-person;
- (viii) comparing the representative c-p heart cycle graph with the reference heart cycle graph, using the second graph comparison metric ρ2(rep;ref), applied to the representative heart cycle graph and to the reference heart cycle graph;
- (ix) when the value ρ2(rep;ref) provided by the second metric ρ2 satisfies ρ2(rep;ref)−ρ2(thr2)=D2, where ρ2(thr2) is a second selected threshold value and D2 is a real number that is always non-negative or that is always non-positive, interpreting this condition as indicating that the candidate-person is likely to be the reference person;
- (x) when the value provided by the second metric ρ2c does not satisfy the condition ρ2(rep;ref)−ρ2(thr2)=D2, with D2 always non-negative or D2 always non-positive, interpreting this condition as indicating that the candidate-person is not likely to be the reference person;
- (xi) when the majority K'$_M$ of the N' c-p heart cycle graphs do not resemble each other, incrementing the count index c' (c'→c'+1);
- (xii) when the incremented count index c' is no greater than a selected maximum index value c'(max), returning to step (iv); and
- (xiii) when the incremented count index c' satisfies c'>c'(max), interpreting this condition as indicating that it is not possible to create a representative heart cycle graph for the candidate-person.

* * * * *